(12) United States Patent
Griffin

(10) Patent No.: US 7,731,124 B2
(45) Date of Patent: Jun. 8, 2010

(54) LANDING GEAR

(75) Inventor: John William Griffin, Winscombe (GB)

(73) Assignee: Airbus Operations Limited, Bristol (GB)

( * ) Notice: Subject to any disclaimer, the term of this patent is extended or adjusted under 35 U.S.C. 154(b) by 217 days.

(21) Appl. No.: 11/460,152

(22) Filed: Jul. 26, 2006

(65) Prior Publication Data
US 2010/0116930 A1    May 13, 2010

(30) Foreign Application Priority Data
Jul. 26, 2005    (GB)    ................................ 0515359.8

(51) Int. Cl.
*B64C 25/10*    (2006.01)
*B64C 25/14*    (2006.01)
(52) U.S. Cl. .............................. 244/102 R; 244/100 R; 244/102 A; 244/102 SS; 244/103 R
(58) Field of Classification Search ............. 244/100 R, 244/102 A, 102 R, 102 SL, 102 SS, 103 R
See application file for complete search history.

(56) References Cited

U.S. PATENT DOCUMENTS

| 2,826,381 | A | * | 3/1958 | Cruz ..................... 244/102 SL |
| 3,195,840 | A | * | 7/1965 | Tollar ..................... 244/102 R |
| 3,652,040 | A | * | 3/1972 | Hartel ..................... 244/104 R |
| 3,784,131 | A | * | 1/1974 | Stratford .................. 244/102 R |
| 4,296,897 | A | * | 10/1981 | Thompson ................... 244/111 |
| 4,328,939 | A | * | 5/1982 | Davies et al. ............ 244/102 R |
| 4,359,199 | A | * | 11/1982 | Kramer et al. ........... 244/100 R |
| 4,720,063 | A | * | 1/1988 | James et al. ............. 244/102 R |
| 4,892,270 | A | * | 1/1990 | Derrien et al. ........... 244/104 R |
| 5,100,083 | A | * | 3/1992 | Large et al. ............. 244/102 SS |
| 6,575,405 | B2 | * | 6/2003 | Bryant et al. ........... 244/102 SL |
| 6,854,689 | B1 | * | 2/2005 | Lindahl et al. .......... 244/102 R |
| 7,066,429 | B2 | * | 6/2006 | Mellor et al. ............ 244/102 R |
| 2004/0129834 | A1 | * | 7/2004 | Luce ...................... 244/100 R |

FOREIGN PATENT DOCUMENTS

EP    0635426 A    1/1995
GB    643636 A    9/1950

* cited by examiner

*Primary Examiner*—Timothy D Collins
*Assistant Examiner*—Philip J Bonzell
(74) *Attorney, Agent, or Firm*—Lowe Hauptman Ham & Berner LLP

(57) ABSTRACT

In an aircraft having an aircraft landing gear, the aircraft landing gear includes an arm, a leg and a bogie at the lower end of the leg. The bogie is moveable in a direction along the length of the leg and pivotable between a trimmed deployed position and a stowable position. The arm is mounted on the landing gear and is rotatable between a first position in which the bogie is positioned in the trimmed deployed position, and a second position in which the bogie is positioned in the stowable position. Movement of the arm can be effected by a positioning rotary actuator, which is not located in the primary or secondary load paths.

18 Claims, 4 Drawing Sheets ered in the art.

LANDING GEAR

RELATED APPLICATIONS

The present application is based on, and claims priority from, British Application Number 0515359.8, filed Jul. 26, 2005, the disclosure of which is hereby incorporated by reference herein in its entirety.

TECHNICAL FIELD

The present invention relates to aircraft. In particular the invention relates to an aircraft including an aircraft landing gear having an apparatus for alignment of a landing gear bogie.

BACKGROUND OF THE INVENTION

Many aircraft include a landing gear assembly comprising a pivotable bogie such that when the aircraft is on the ground, the bogie is generally aligned with the ground, whereas just prior to landing, and immediately following take-off, the bogie can be trimmed at an angle to the ground. Trimming the bogie in such a way provides a number of advantages as will be understood by the person skilled in the art.

It is advantageous to be able to stow a landing gear assembly during flight, and more particularly to stow the landing gear assembly within a particular area of the aircraft. To efficiently use the available space, it is therefore particularly advantageous to be able to position the pivotable bogie between the above-mentioned trimmed configuration, and a stowable position. In general, the stowable position will be such that the bogie is at a specific angle, and often such that it is untrimmed and/or is perpendicular to the leg of the landing gear.

It is known to trim aircraft landing gear bogies using pitch trimmers as linear actuators. Often these pitch trimmer actuators are also additionally configured to position the bogie for stowage. Such an arrangement is shown in U.S. Pat. No. 6,575,405, which is incorporated herein by reference it its entirety. However, such arrangements are often unduly heavy, bulky and/or complex. For example, the pitch trimming arrangements of U.S. Pat. No. 6,575,405 would appear to be subjected to the significant loads generated during both take-off and landing of the aircraft. The pitch trimming arrangements must therefore be especially strong, and may be unfavourably heavy. Furthermore, in the case of a pitch trimmer in the form of a hydraulic ram or the like, considerable loads are transmitted via hydraulic fluid, which is particularly undesirable.

SUMMARY OF THE INVENTION

It is an aim of the present invention to provide an aircraft landing gear with an improved bogie trimming and positioning arrangement. Alternatively or additionally, it is an aim to provide an aircraft landing gear which mitigates at least some of the above-mentioned problems.

According to the invention there is provided an aircraft including an aircraft landing gear, the aircraft landing gear comprising an arm, a leg and a bogie at the lower end of the leg, the bogie being moveable in a direction along the length of the leg and pivotable between a trimmed deployed position and a stowable position, wherein the arm is mounted on the landing gear and is rotatable between a first position in which the bogie is positioned in the trimmed deployed position, and a second position in which the bogie is positioned in the stowable position. Such a configuration, in which movement of the bogie between the trimmed deployed position and the stowable position is linked to, or otherwise associated with, rotary motion of an arm, enables the actuation of the bogie positioning for stowage to be effected without requiring the actuator to be arranged to sustain certain loads generated in the landing gear. As such, any actuator used to effect the deployment, positioning and/or trimming of the landing gear bogie preferably need not in use support loads of a magnitude comparable with those sustained by the landing gear leg.

The movement of the arm between the first position and the second position preferably effects the movement of the bogie between the trimmed deployed position and the stowable position. The movement of the arm may be effected by a positioning actuator, and more preferably by a rotary positioning actuator. The positioning actuator preferably includes a no-back-drive arrangement. The positioning actuator may comprise a worm-gear arrangement. The positioning actuator may comprise a rack and pinion arrangement. The rotatable arm may thereby provide a simplified arrangement to position the bogie and may mitigate the use of heavy and/or complex actuators, such as hydraulic rams or the like. The arm may be mounted on the leg of the landing gear.

During use, and more particularly during take-off and landing, an aircraft landing gear is subjected to considerable loads such as those transmitted through the bogie. A significant portion of the loads may be transmitted along a primary load path, and preferably additionally along a secondary load path. Loads transmitted along the primary load path may for example be reacted through the bogie directly into, and along the length of, the leg of the landing gear. Loads transmitted along the secondary load path may for example be reacted through the bogie into links connected between the bogie and the leg of the landing gear, such links for example including a pitch trimming arrangement. The magnitude of loads in such components of a landing gear can be significant. For example, the loads in a pitch trimmer can exceed 700 kN during landing. It will be understood that at least one embodiment of the present invention is able to provide a number of advantages in the distribution of the considerable loads to which the landing gear is subjected. The landing gear may be so arranged that a significant portion of the loads which are sustained in the landing gear on landing and/or take-off of the aircraft, are transmitted along the primary load path, and the landing gear is so arranged that the positioning actuator is not located in the primary load path. More preferably, the positioning actuator is additionally not located in the secondary load path. The landing gear may be so arranged that the positioning actuator is subjected to less than 10% of the maximum load sustained by the landing gear on take-off and/or landing of the aircraft. More preferably the landing gear is so arranged that the positioning actuator is subjected to less than 2% of the maximum load sustained by the landing gear on take-off and/or landing of the aircraft. Yet more preferably the landing gear is so arranged that the positioning actuator is subjected to a negligible proportion of the maximum load sustained by the landing gear on take-off and/or landing of the aircraft.

Preferably one end of the arm is rotatably mounted in a bearing. The majority of the loads which are transmitted through the arm during take-off and landing, may be reacted through the bearing and not the positioning actuator. The loads may thereby be transferred to the leg without needing to place any significant loading on the positioning actuator. The landing gear may therefore be so arranged that substantially all of the considerable loads which are transmitted through the bogie during take-off and landing, are transferred directly to the leg without being transmitted via the positioning actuator.

The landing gear may further comprise a stop, wherein the landing gear is so arranged that when the arm is in the first position, the arm is in contact with the stop. The landing gear may comprise a plurality of stops. Preferably the landing gear is so arranged that when the arm is in the first position, during take-off and landing of the aircraft, the arm is subjected to a moment in a direction opposite to that required to move the arm from the first to the second position. More preferably, during take-off and landing, the arm is subjected to a moment that tends to move the arm against a stop. It will be understood that at least one embodiment of the present invention therefore allows some of the considerable loads, which are transmitted through the bogie during take-off and landing, to be transferred to the landing gear leg through a stop, or plurality of stops, on the leg. Again such a configuration can enable an actuator for affecting positioning for stowage of the bogie to be protected from the considerable loads sustained by the landing gear leg.

The landing gear may be configured in a semi-levered arrangement. It will be understood by the person skilled in the art, that the landing gear is in a semi-levered arrangement when the centre of rotation of the bogie has been shifted from the main connection between the bogie and the leg, to a location away from this position, for example to a location at one end of the bogie. Preferably the landing gear is configured in a semi-levered arrangement when it is in the trimmed deployed position.

The arm may be connected to the bogie via a link. The link may be an extendible link. Preferably the link acts as a fixed link (i.e. non-extendible link) when the bogie is in the semi-levered arrangement. The link may be in the form of a conventional pitch trimmer, for example, comprising a hydraulic ram. Preferably the landing gear is so arranged that the link is fully extended when the bogie is in the trimmed deployed position. A tensile load on the link, for example that experienced on take-off or landing, will therefore be transmitted via the mechanical linkage of the fully extended link, rather than via the means that affects extension of the link, for example, hydraulic fluid.

The link may be compressible when the landing gear is in a particular arrangement, for example when the aircraft is taxiing, on the early stages of take-off or the latter stage of landing. The link may be in the form of a shock-absorber. The link may comprise hydraulic fluid. Providing a compressible link may allow the landing gear to act as a damper or shock absorber in these circumstances.

The link may be connected to the arm at a first pivot. Alternatively, or additionally, the link may be connected to the bogie at a pivot, for example a second pivot. The landing gear is preferably arranged such that when the landing gear is in the trimmed deployed position, the first and second pivots and the location at which the arm is rotatably mounted on the leg are substantially in line. The landing gear preferably comprises (i) a first pivot at which the link is connected to the arm and (ii) a second pivot at which the link is connected to the bogie, wherein the landing gear is arranged such that when the landing gear is in the trimmed deployed position, the first and second pivots and the location at which the arm is rotatably mounted on the leg are substantially in line.

The landing gear is preferably arranged such that, during use immediately after landing when the bogie is rotated away from the trimmed deployed position, the majority of the loads sustained by the link are along the length of the link rather than loads urging the link to rotate. The link and the arm may not be subjected to significant moments during take-off and/or landing of the aircraft, and therefore the positioning actuator is not subjected to significant loading, more particularly significant torsion loading, in these circumstances.

Preferably, the landing gear further comprises a position sensor. The position sensor may be arranged to output a signal in dependence on the position of the arm relative to the leg. The position sensor may be arranged to indicate, and yet more preferably measure, the position of the arm relative to the leg. In particular the position sensor may be arranged to measure the position of the arm relative to a stop, or more preferably a plurality of stops. A plurality of position sensors may be provided in order to perform the afore-mentioned functions.

The landing gear may further comprise a control unit. The control unit may be arranged to control the movement of the arm, preferably in response to the output from the position sensor.

The landing gear may be provided with a fail-safe component. The positioning actuator may be provided with a fail-safe component. The fail-safe component may be so arranged that it fails (i.e. its structural integrity fails) if a force on the landing gear exceeds a threshold level. The fail-safe component may be arranged to fail when the positioning actuator is subjected to a force, for example a torsion force, above a threshold level. Alternatively or additionally, the fail-safe component may be arranged to fail when the link is subjected to a compressive force above a threshold level. The fail-safe component may be arranged to fail only when the bogie is in the stowable position. Preferably, failure of the fail-safe component allows the landing gear to adopt a stable configuration. The failure of the fail-safe component may allow the arm to rotate to the first position. The link may be subject to excessive compressive force if, for example, the aircraft is forced to land with the bogie in the stowable position. The above-mentioned arrangement thereby provides a relatively safe landing gear. The landing gear may, for example, be able to be used for landing even when the bogie is not in the intended position for landing, such that failure of the fail-safe component causes the landing gear to adopt a stable and relatively safe configuration.

The fail-safe component may be relatively cheap to replace. Preferably, failure of the fail-safe component does not cause damage to other, for example neighbouring, components on the landing gear and/or aircraft.

In addition to the above-mentioned safety features of the present invention, the landing gear may include a second positioning actuator, the second actuator acting as a back-up to the first positioning actuator. The second positioning actuator may therefore be used to effect movement of the arm, should the first positioning actuator fail. The second positioning actuator may be in the form of a motor and drive train.

According to another aspect of the invention, there is provided an aircraft landing gear for use on the aircraft according to any aspect of the present invention as described herein.

According to another aspect of the invention, there is provided a method of aligning a bogie on the aircraft according to any aspect of the present invention as described herein, the method including the step of rotating the arm from the first position to the second position.

BRIEF DESCRIPTION OF THE DRAWINGS

Embodiments of the present invention will now be described by way of example with reference to the accompanying drawings of which.

DETAILED DESCRIPTION OF EMBODIMENTS

Figure 1:
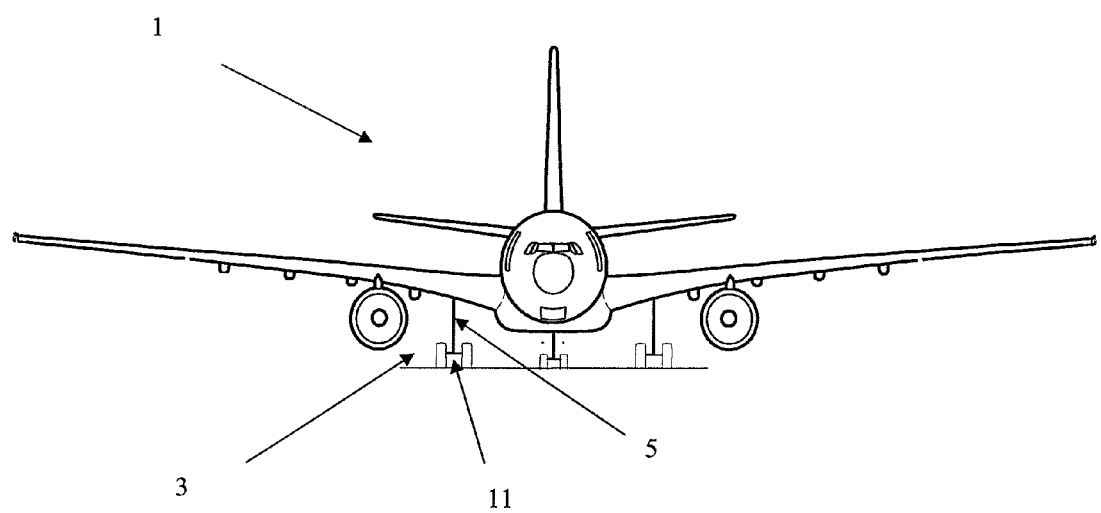
FIG. 1 is a schematic of an aircraft according to a first embodiment of the invention.
Figure 2:
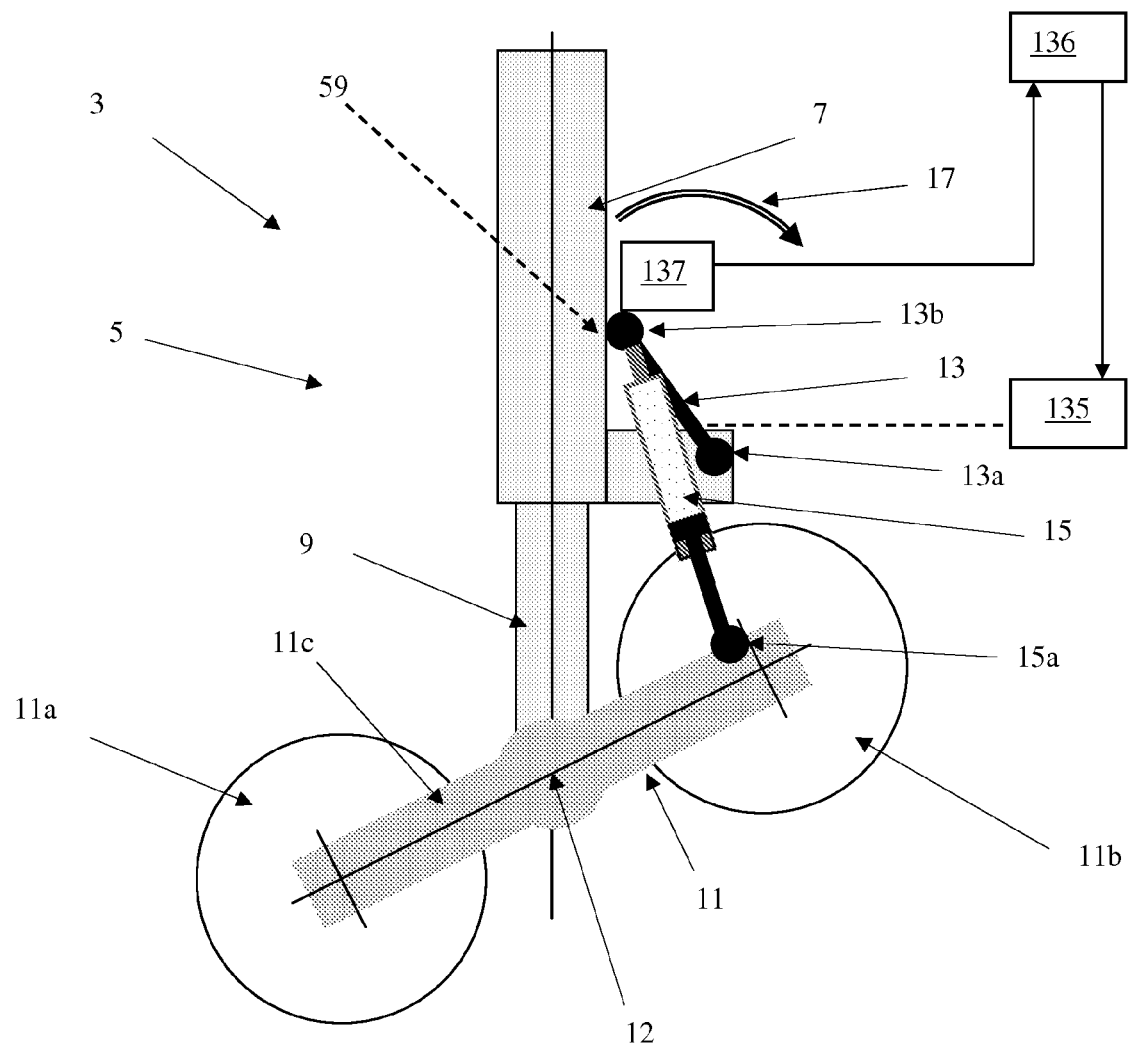
FIG. 2 is a schematic of the landing gear on an aircraft according to the first embodiment of the invention, with the bogie in the trimmed deployed position.

With reference to FIGS. 1 and 2, an aircraft 1 includes a landing gear 3 comprising a leg 5, including a main fitting 7 and a tube 9 slideably mounted therein. The tube 9 is resiliently biased in the main fitting 7 by a spring and damper system (not shown), the tube and main fitting arrangement thereby being able to act as a shock absorber. A bogie 11 comprising a rear set of wheels 11a, a front set of wheels 11b, and a bogie carriage 11c, is pivotably mounted at a mounting 12 on the end of the tube 9. An arm 13 is rotatably mounted at one end 13a to the main fitting 7 and is linked at the other end 13b to the bogie 11 by a link 15.

FIG. 2 shows the bogie 11 in the trimmed deployed position, namely with the bogie 11 at an angle to the ground (not shown). The arm 13 is in an over centre position such that one end 13b is in contact with a stop (schematically shown at 59 in FIG. 2) on the leg. The link 15 is in the form of a simple hydraulic device. The link 15 is extendible and, in FIG. 2, is fully extended such that rotation of the bogie, caused by movement of the rear wheel 11a in a vertical direction (with respect to FIG. 2), is about a centre of rotation at the connection 15a between the link 15 and the bogie carriage 11c, rather than the connection 12 between the bogie carriage 11c and the tube 9. As will be appreciated by the person skilled in the art, the landing gear 3 is therefore in a semi-levered arrangement.

Figure 3:
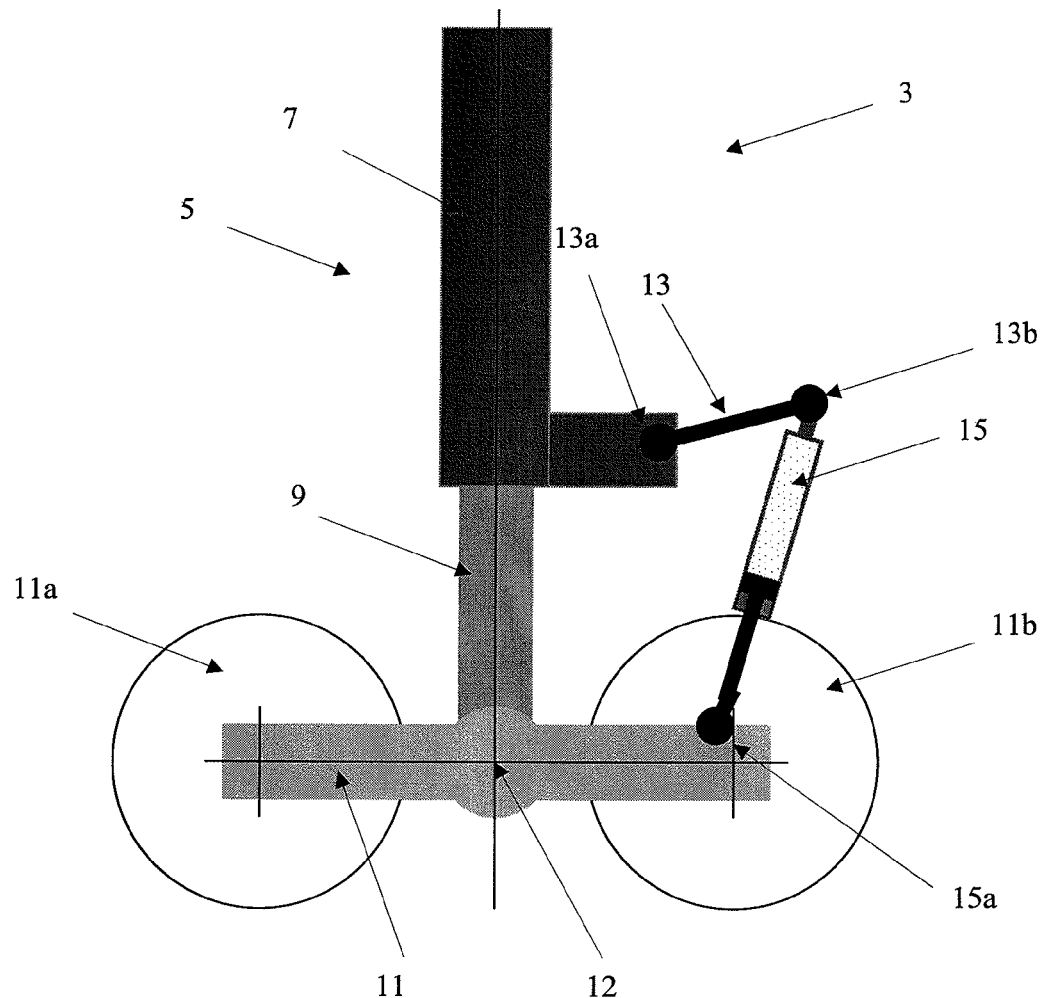
FIG. 3 is a schematic of the landing gear on an aircraft according to the first embodiment of the invention, with the bogie in the stowable position.

FIG. 3 shows the arm 13 is in a second position and the bogie 11 in a stowable position. In the first embodiment of the invention, the stowable position is such that the bogie 11 is perpendicular to the leg 5. The bogie 11 is positioned in the stowable position shortly before the landing gear 3 is retracted into the aircraft 1. Movement of the bogie 11 between the trimmed deployed position and the stowable position will now be described with reference to both FIGS. 2 and 3.

With the landing gear in the position shown in FIG. 2, a control unit (schematically shown at 136 in FIG. 2) sends a signal to a rotary positioning actuator (schematically shown at 135 in FIG. 2) which in turn causes rotation of the arm 13 in a direction shown by the arrow 17 in FIG. 2. The rotary actuator 135 is located in a bearing on the leg, and is in the form of an electro-mechanical worm-gear arrangement. The rotary actuator 135 has a duplicated gearbox and motor as a safety precaution and has a failure rate in the order of 5.0× 10-8 per flight hour.

The rotary positioning actuator 135 causes the arm 13 to rotate between the over-centre position and a second position corresponding to that shown in FIG. 3, causing the bogie 11 to pivot about its pivotable mounting 12 on the tube 9. The link 15 remains as an effective fixed-link due to internal hydraulic pressure, the weight of the bogie 11 and the resilient biasing of landing gear leg 5. As the arm 13 approaches the second position, position sensors (schematically shown at 137 in FIG. 2) on the main fitting 7, send signals to the control unit 136 in dependence on the position of the arm 13. When the position sensors 137 indicate that the arm 13 is in the second position, the control unit 136 sends a signal to the rotary actuator 135 to stop rotation of the arm 13. The arm is thereby rotated to the second position, in which the bogie 11 is positioned in the stowable position. The landing gear 3 may then be stowed in accordance with known methods.

A similar procedure is adopted to position the bogie from the stowable position to the trimmed deployed position. This procedure is used as the aircraft approaches landing, after the landing gear has been deployed. The control unit 136 sends a signal to the rotary actuator 135 which in turn causes rotation of the arm 13 in a counter-clockwise rotation with respect to FIG. 3. As the arm approaches the stop 59 on the leg 5, position sensors 137 send signals to the control unit 136 in dependence on the position of the arm. When the position sensors 137 indicate that the arm is just in contact with the stop 59, the control unit 136 sends a signal to the rotary actuator 135 to stop rotation of the arm.

The first embodiment of the invention not only provides a relatively simple bogie pitch trimming and positioning arrangement, but also gives rise to a number of advantages in the distribution of loads within the landing gear. Referring to FIG. 2, the arm 13 is slightly angled towards the main fitting 7 such that the upper end 13b is located against the stop. The angle of the arm with respect to the link and to the vertical shown in FIG. 2, is exaggerated for the sake of clarity. It will be understood that the location at which the arm is rotatably mounted 13a, the pivotable connection between the upper end 13b of the arm and the link, and the pivotable connection 15a between the link 15 and the bogie carriage 11c are all substantially in line. It will be appreciated that positioning the arm in this way gives rise to a number of advantages. In particular, when the link 15 is subjected to tension, for example when only the rear set of wheels 11a are on the ground, the arm 13 transmits primarily compressive loads which are borne by the main fitting 7 and bearing of the actuator. Furthermore, the moment to which the arm is subjected causes the arm to press against the stop rather than generate a torsion load in the actuator. The primary load path is along the length of the tube 9 and the secondary load path is along the link 15. The rotary positioning actuator is not therefore located in either the primary or the secondary load paths. The large forces generated on take-off and landing are not therefore borne by the rotary positioning actuator itself.

Figure 4:
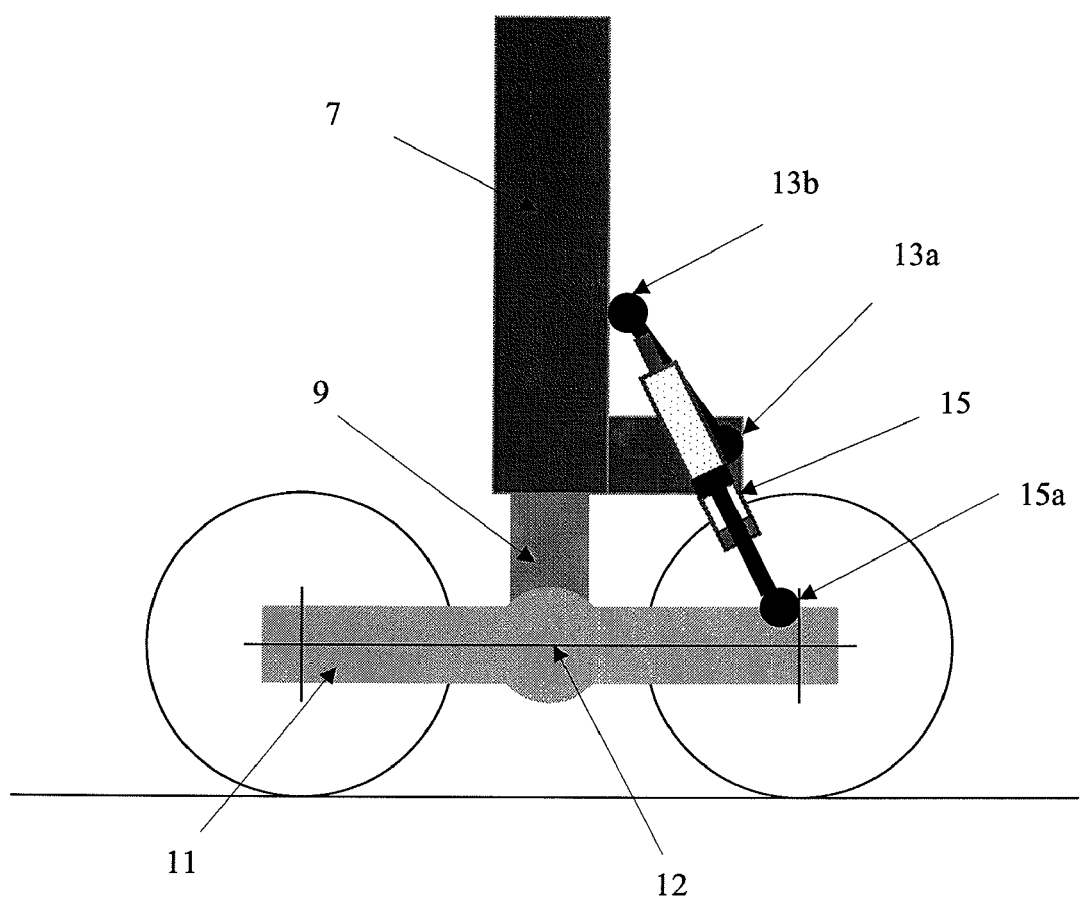
FIG. 4 is a schematic of the landing gear on an aircraft according to the first embodiment of the invention, in an on-ground configuration.

The arm and link arrangement in the first embodiment of the invention also provides a number of advantages when all the sets of wheels on the bogie are on the ground, for example during taxiing, the early stages of take-off or the latter stages of landing. Referring to FIG. 4, when the aircraft 1 is on the ground, the arm 13 is held in the over-centre position by the worm-gear arrangement in the rotary actuator. The link 15 and the main fitting/tube arrangement are compressed and act as shock absorbers and dampers thereby reducing shocks and vibration.

According to a second embodiment of the invention (not shown) the rotary actuator is provided with a fail-safe device. When the actuator is subjected to excessive torsion and the bogie is in the stowable position, a fusible structural element in the device is arranged to shear, allowing the arm to rotate away from the second position. If, for example, the aircraft is forced to land with the bogie in the stowable position, the arm will therefore rotate to allow the bogie to freely achieve a stable alignment and a significant portion of the loads generated during landing may be reacted through the arm 13 and link 15 and the bearing at 13a.

The invention is of greater application to larger aircraft. The aircraft is preferably of a size equivalent to an aircraft designed to carry more than 50 passengers, and more preferably more than 100 passengers.

Whilst the present invention has been described and illustrated with reference to particular embodiments, it will be appreciated by those of ordinary skill in the art that the invention lends itself to many different variations not specifically illustrated herein. Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims.

The invention claimed is:

1. An aircraft, comprising an aircraft landing gear, the aircraft landing gear comprising:
    an arm,
    an actuator arranged to rotate the arm,
    a stop for limiting rotary movement of the arm during takeoff and landing of the aircraft,
    a leg on which the arm is rotatably mounted, and
    a bogie at a lower end of the leg, the bogie being moveable in a direction along a length of the leg and pivotable between a trimmed deployed position and a stowable position,
    wherein movement of the bogie between the trimmed deployed position and the stowable position is associated with rotary movement of the arm, by the actuator, between (i) a first position in which the bogie is positioned in the trimmed deployed position and (ii) a second position in which the bogie is positioned in the stowable position and in which the arm is completely separate from the stop,
    the landing gear being arranged such that the actuator is able to cause movement of the bogie from the trimmed deployed position to the stowable position, without requiring the actuator to sustain large forces generated on take off and landing of the aircraft;
    wherein
    the arm is connected to the bogie via a link; and
    the link has an extendible length that is fully extended when the bogie is in the trimmed deployed position and the arm is in the first position.

2. An aircraft according to claim 1, wherein movement of the arm between the first position and the second position effects movement of the bogie between the trimmed deployed position and the stowable position.

3. An aircraft according to claim 1, wherein the aircraft landing gear is so arranged that when the arm is in the first position, the arm is in contact with the stop.

4. An aircraft according to claim 1, wherein the aircraft landing gear is so arranged that during at least one of (i) take-off and (ii) landing of the aircraft, the arm is in the first position and is subjected to a moment in a direction opposite to that required to move the arm from the first to the second position.

5. An aircraft according to claim 1, wherein the landing gear is configured in a semi-levered arrangement.

6. An aircraft according to claim 1, wherein the landing gear is arranged such that the actuator is subjected to less than 10% of the maximum load sustained by the landing gear on take-off and/or landing of the aircraft.

7. A method of aligning the bogie on the aircraft of claim 1, the method comprising:
    causing the actuator to rotate the arm from the first position to the second position.

8. An aircraft according to claim 1, the landing gear further comprising
    (i) a first pivot at which the link is pivotably connected to the arm, and
    (ii) a second pivot at which the link is pivotably connected to the bogie,
    wherein, when the bogie is in the trimmed deployed position and the arm is in the first position, the first and second pivots and the location at which the arm is rotatably mounted on the leg are substantially in line.

9. An aircraft according to claim 8, wherein, when the bogie is in the trimmed deployed position and the arm is in the first position, the location at which the arm is rotatably mounted on the leg is positioned, as seen in a longitudinal direction of said link, between the first and second pivots.

10. An aircraft according to claim 1, further comprising:
    a position sensor arranged to output a signal in dependence on the position of the arm relative to the leg.

11. An aircraft according to claim 10, further comprising:
    a control unit arranged to control the actuator to rotate the arm in response to the output signal from the position sensor.

12. An aircraft, comprising an aircraft landing gear, the aircraft landing gear comprising:
    an arm,
    an actuator arranged to rotate the arm,
    a stop for limiting rotary movement of the arm during takeoff and landing of the aircraft,
    a leg on which the arm is rotatably mounted, and
    a bogie at a lower end of the leg, the bogie being moveable in a direction along a length of the leg and pivotable between a trimmed deployed position and a stowable position,
    wherein movement of the bogie between the trimmed deployed position and the stowable position is associated with rotary movement of the arm, by the actuator, between (i) a first position in which the bogie is positioned in the trimmed deployed position and (ii) a second position in which the bogie is positioned in the stowable position and in which the arm is completely separate from the stop,
    the landing gear being arranged such that the actuator is able to cause movement of the bogie from the trimmed deployed position to the stowable position, without requiring the actuator to sustain large forces generated on take off and landing of the aircraft;
    wherein
    the arm is connected to the bogie via a link; and
    the landing gear is arranged such that, during takeoff and landing of the aircraft and in the deployed position, the net force to which the link is subjected, has a component along the length of the link that is considerably greater than the component of force normal to the length of the link, and the net force to which the arm is subjected has a component along the length of the arm that is considerably greater than the component of force normal to the length of the arm.

13. An aircraft landing gear, comprising:
    an arm;
    an actuator arranged to rotate the arm;
    a stop for limiting rotary movement of the arm during takeoff and landing of the aircraft;
    a leg on which the arm is rotatably mounted; and a bogie at a lower end of the leg, the bogie being moveable in a direction along a length of the leg and pivotable between a trimmed deployed position and a stowable position;

wherein movement of the bogie between the trimmed deployed position and the stowable position is associated with rotary movement of the arm, by the actuator, between (i) a first position in which the bogie is positioned in the trimmed deployed position and (ii) a second position in which the bogie is positioned in the stowable position and in which the arm is completely separate from the stop;

the landing gear being arranged such that the actuator is able to cause movement of the bogie from the trimmed deployed position to the stowable position, without requiring the actuator to sustain large forces generated on take off and landing of the aircraft;

wherein the arm is connected to the bogie via a link; and the link has an extendible length that is fully extended when the bogie is in the trimmed deployed position and the arm is in the first position.

14. In an aircraft, the improvement comprising an aircraft landing gear, the aircraft landing gear comprising:

an arm, an actuator arranged to rotate the arm, a stop for limiting rotary movement of the arm during takeoff and landing of the aircraft, a leg on which the arm is rotatably mounted, and a bogie at a lower end of the leg, the bogie being moveable in a direction along a length of the leg and pivotable between a trimmed deployed position and a stowable position, wherein movement of the bogie between the trimmed deployed position and the stowable position is associated with rotary movement of the arm, by the actuator, between (i) a first position in which the bogie is positioned in the trimmed deployed position and (ii) a second position in which the bogie is positioned in the stowable position and in which the arm is completely separate from the stop, the landing gear being arranged such that the actuator is able to cause movement of the bogie from the trimmed deployed position to the stowable position, without requiring the actuator to sustain large forces generated on take off and landing of the aircraft;

wherein the arm is connected to the bogie via a link; and when the bogie is in the trimmed deployed position and the arm is in the first position, a tensile force, which occurs along the longitudinal direction of the link during take-off and landing of the aircraft, generates a compressive force in the arm while pulling the arm toward and against the stop in a direction opposite to that required to move the arm from the first to the second position.

15. An aircraft, comprising an aircraft landing gear, the aircraft landing gear comprising:

a leg, a stop on the leg, an arm rotatably mounted on the leg, said arm being rotatable between a first position, where the arm rests on the stop, and a second position where the arm is completely separate from the stop, a bogie at a lower end of the leg, the bogie being moveable along a longitudinal direction of the leg and pivotable between a trimmed deployed position and a stowable position, and a link comprising, along a longitudinal direction thereof, first and second pivots at which the link is pivotably connected to the arm and the bogie, respectively, to effect movement of the bogie between the trimmed deployed position and the stowable position by rotary movement of the arm between the first position, in which the bogie is positioned in the trimmed deployed position, and the second position, in which the bogie is positioned in the stowable position, wherein, when the bogie is in the trimmed deployed position and the arm is in the first position, the location at which the arm is rotatably mounted on the leg is positioned, as seen in the longitudinal direction of said link, between the first and second pivots.

16. An aircraft according to claim 15, further comprising:

an actuator arranged to rotate the arm, and a control unit arranged to controllably cause the actuator to rotate the arm from the first position to the second position, thereby moving the bogie from the trimmed deployed position into the stowable position after take-off of the aircraft.

17. An aircraft according to claim 15, wherein, when the bogie is in the trimmed deployed position and the arm is in the first position, a tensile force, which occurs along the longitudinal direction of the link during take-off and landing of the aircraft, generates a compressive force in the arm while pulling the arm toward and against the stop in a direction opposite to that required to move the arm from the first to the second position.

18. An aircraft according to claim 17, wherein the link has, between said first and second pivots, an extendible length that is fully extended when the bogie is in the trimmed deployed position and the arm is in the first position.

* * * * *